US010995882B2

(12) United States Patent
Anderson (10) Patent No.: US 10,995,882 B2
(45) Date of Patent: May 4, 2021

(54) CLAMP FOR CIRCULAR OBJECTS (71) Applicant: ERICO INTERNATIONAL CORPORATION, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 17/000,543

(22) Filed: Aug. 24, 2020

(65) Prior Publication Data

US 2020/0386348 A1    Dec. 10, 2020

Related U.S. Application Data

(63) Continuation of application No. 16/548,485, filed on Aug. 22, 2019, now Pat. No. 10,816,107, which is a continuation of application No. 15/986,338, filed on May 22, 2018, now Pat. No. 10,393,290.

(60) Provisional application No. 62/509,505, filed on May 22, 2017.

(51) Int. Cl.
*F16L 3/10* (2006.01)
*F16B 2/10* (2006.01)

(52) U.S. Cl.
CPC ............. *F16L 3/1091* (2013.01); *F16B 2/10* (2013.01); *F16L 3/1016* (2013.01); *F16L 3/1075* (2013.01)

(58) Field of Classification Search
CPC .......... F16L 3/1091; F16L 3/1075; F16B 2/10
USPC ... 248/49, 62, 67.7, 74.4, 74.5, 643, 229.15, 248/229.25, 228.6, 230.6, 231.71
See application file for complete search history.

(56) References Cited

U.S. PATENT DOCUMENTS

| 622,739 | A | | 4/1899 | Wahlert |
| 1,373,235 | A | | 3/1921 | Giberson |
| 1,776,343 | A | | 9/1930 | Allyn |
| 2,550,001 | A | * | 4/1951 | Button ................... F16L 3/1091 248/49 |
| 3,227,406 | A | | 1/1966 | Shelton et al. |
| 3,251,615 | A | * | 5/1966 | Short, III ................ F16L 17/04 285/112 |
| 3,788,677 | A | * | 1/1974 | Stade .................. F01N 13/1805 285/367 |
| 4,373,235 | A | | 2/1983 | Korgaonkar |
| D298,802 | S | * | 12/1988 | Tekirian ........................ D8/396 |
| 4,915,305 | A | | 4/1990 | O'Brien et al. |
| 5,727,762 | A | * | 3/1998 | Cosentino ............. F16L 3/1016 248/154 |
| 6,626,466 | B1 | | 9/2003 | Dole |
| 7,090,259 | B2 | | 8/2006 | Dole |

(Continued)

OTHER PUBLICATIONS

Eaton; Pipe Clamps; catalog; 36 pages.
(Continued)

*Primary Examiner* — Muhammad Ijaz
(74) *Attorney, Agent, or Firm* — Quarles & Brady LLP (57) ABSTRACT

A clamp can be configured to secure a circular object and can include a first clamp member and a second clamp member. The first clamp member can include a first clamp portion and the second clamp member can include a second clamp portion. The first clamp portion and the second clamp portion can be configured to receive the circular object therebetween, and to secure the circular object within the clamp with the second clamp member nested with the first clamp member.

18 Claims, 8 Drawing Sheets

(56) References Cited

U.S. PATENT DOCUMENTS

| | | | |
|---|---|---|---|
| 7,140,579 B2 | 11/2006 | Kirschner | |
| 7,490,388 B2 | 2/2009 | Van Walraven | |
| 8,047,476 B2 | 11/2011 | Van Walraven | |
| 8,100,368 B2 | 1/2012 | Jackson et al. | |
| 8,276,854 B2 | 10/2012 | Mominee et al. | |
| 8,313,065 B2 | 11/2012 | Birch | |
| 8,464,987 B1 | 6/2013 | Decesare et al. | |
| D692,294 S | 10/2013 | Koeniger et al. | |
| 8,573,543 B2 | 11/2013 | Mominee et al. | |
| 8,596,589 B2 | 12/2013 | Hennon | |
| 8,746,632 B2 * | 6/2014 | Walraven | F16L 3/1091 248/62 |
| 9,010,697 B1 | 4/2015 | Kirschner | |
| 9,033,289 B2 | 5/2015 | Hennon | |
| 9,038,968 B2 | 5/2015 | Hennon | |
| 9,039,046 B2 | 5/2015 | Beagen, Jr. | |
| 9,168,585 B2 | 10/2015 | Schell et al. | |
| 9,194,516 B2 | 11/2015 | Beagen, Jr. | |
| 9,297,484 B2 | 3/2016 | Beagen, Jr. | |
| 9,500,307 B2 | 11/2016 | Beagen, Jr. | |
| 9,518,684 B2 | 12/2016 | Juzak et al. | |
| 9,534,715 B2 | 1/2017 | Beagen, Jr. | |
| 9,631,746 B2 | 4/2017 | Beagen, Jr. | |
| 2007/0131823 A1 * | 6/2007 | Mominee | F16L 3/1016 248/62 |
| 2008/0246279 A1 | 10/2008 | Van Walraven | |
| 2008/0277535 A1 | 11/2008 | Kirschner | |
| 2014/0259397 A1 * | 9/2014 | McReynolds | A47C 20/041 5/412 |
| 2015/0375298 A1 | 12/2015 | Schell et al. | |
| 2017/0016560 A1 | 1/2017 | Beagen, Jr. | |
| 2017/0074433 A1 | 3/2017 | Beagen, Jr. | |
| 2017/0184233 A1 | 6/2017 | Beagen, Jr. | |
| 2018/0335165 A1 * | 11/2018 | Anderson | F16B 2/10 |

OTHER PUBLICATIONS

Hilti MI/MQ Technical Guide; 5.0 Installation System Hangers; MI/MQ Technical Guide 2015; 1 page.
Hilti MH-SLR-LH Riser clamp; technical data; 4 pages.
Hilti MH-SLR-LS Riser clamp; technical data; 4 pages.
NORMA Group; NORMA Americas; Distribution Services Product Catalog; <www.normaAmericasDS.com>; 53 pages.
NORMA Group; NORMA Americas Distribution Services featuring; R.G.Ray® 853-Series T-Bolt product list; 7 pages.
NVent Caddy; 512 nVent Caddy EZ Riser for Close Quarters product list; <www erico com/category asp?category=R1395>; 2 pages.
NVent Caddy; 510 nVent Caddy EZ product list; <www erico com/category asp?category=R345&language=en>; 2 pages.
PHD Manufacturing, Inc. Pipe Clamps Archives product list; <phd-mfg.com/product-category/pipe-hangers-devices/pipe-clamps/>; 12 pages.
R.G.Ray®; V-Clamps Halves; <www.normaAmericasDS.com>; 1 page.

* cited by examiner

CLAMP FOR CIRCULAR OBJECTS

RELATED APPLICATIONS

This application claims priority to U.S. Provisional Patent Application No. 62/509,505, titled "Clamp for Circular Objects" and filed on May 22, 2017, U.S. Non-Provisional patent application Ser. No. 15/986,338 titled "Clamp for Circular Objects" and filed on May 22, 2018, and U.S. Non-Provisional patent application Ser. No. 16/548,485 titled "Clamp for Circular Objects" and filed on Aug. 22, 2019, the entirety of which are incorporated herein by reference.

BACKGROUND

A clamp can generally be used to support a circular object (for example, when supporting piping vertically within building structures). In some configurations, a clamp can wrap around the circumference of the object, with extension arms providing additional support relative to other structures. For example, a riser clamp that is configured to support a vertically oriented pipe (e.g., a riser pipe) that extends through a hole can secure the pipe within the clamp via a frictional engagement, while the extension arms can engage structure (e.g., floor structure) around the hole to prevent the pipe and the clamp from slipping vertically through a hole.

Some conventional clamps can exhibit multi-piece configurations. For example, two separate clamp members may be configured to be placed together, surrounding a circular object. Once properly placed, the clamp members can be secured together around the object with bolts or other fasteners.

SUMMARY

Embodiments of the invention can provide an improved circular clamp, including a nested clamp configured for ease of installation and for use with higher loads.

In some embodiments, a clamp can be configured to secure a circular object and can include a first clamp member and a second clamp member. The first clamp member can have a first C-shaped cross-sectional profile, and a first clamp portion. The second clamp member can have a second C-shaped cross-sectional profile, and a second clamp portion. The first clamp portion and the second clamp portion can be configured to receive the circular object therebetween, to secure the circular object within the clamp, with the second C-shaped cross-sectional profile nested with the first C-shaped cross-sectional profile.

In some embodiments, a clamp can be configured to secure a circular object and can include a first clamp member and a second clamp member. The first clamp member can have first cross-sectional profile that includes a first base portion and first legs extending from opposing sides of the first base portion. The second clamp member can have a second cross-sectional profile that includes a second base portion and second legs extending from opposing sides of the second base portion. The second clamp member can be configured to removably nest with the first clamp member to secure the circular object, with the first legs disposed one of inside or outside of the second legs so that the first and second clamp member collectively form a box-shaped cross-sectional profile.

In some embodiments, a riser clamp can be configured to secure a pipe and can include a first clamp member and a second clamp member. Each of the first and second clamp members can include, respectively, a clamp portion, a first arm, a second arm, and a cross-sectional profile that extends along the clamp portion, the first arm, and the second arm. The cross-sectional profile can include a base portion and legs extending from opposing sides of the base portion, the first arm including a first elongate slot extending away from the clamp portion, and the second arm including a second elongate slot extending away from the clamp portion.

In an installed configuration of the riser clamp, the first and second clamp members can nest together to secure the pipe, with the legs of the first clamp member disposed one of inside or outside of the legs of the second clamp member, so that the first and second clamp members collectively form a substantially rectangular cross-sectional profile along the first and second arms of the first and second clamp members. The first elongate slot of the second clamp member can extend onto an angled end of the first arm of the second clamp member. The angled end can be configured to nest with the first arm of the first clamp member with the riser clamp in an installation configuration, and to angle away from the first arm of the first clamp member in the installed configuration. The second elongate slot of the second clamp member can open out of an end of the second arm of the second clamp member opposite the clamp portion of the second clamp member.

In some embodiments, a clamp to secure a circular object can include a first clamp member and a second clamp member. The first clamp member can have a first clamp portion and first arms extending from opposing sides of the first clamp portion, with each of the first arms exhibiting a respective first C-shaped cross-sectional profile. The second clamp member can have a second clamp portion and second arms extending from opposing sides of the second clamp portion, with each of the second arms exhibiting a respective second C-shaped cross-sectional profile. The first clamp portion and the second clamp portion can be configured to secure the circular object therebetween, with each of the first arms aligned with a corresponding one of the second arms and with the first C-shaped cross-sectional profile of each of the first arms nested within the second C-shaped cross-sectional profile of the corresponding one of the second arms.

In some embodiments, a clamp to secure a circular object can include a first clamp member and a second clamp member. The first clamp member can have first arms on opposing sides of a first clamp portion, with a first cross-sectional profile that extends onto each of the first arms and includes: a first base portion, and first legs extending perpendicularly from opposing sides of the first base portion. A second clamp member can have second arms on opposing sides of a second clamp portion, with a second cross-sectional profile that extends onto each of the second arms and includes: a second base portion, and second legs extending perpendicularly from opposing sides of the second base portion. Each of the first arms can be configured to align with a corresponding one of the second arms when the circular object is secured by the clamp. The first cross-sectional profile along each of the first arms can be configured to removably nest within the second cross-sectional profile along the corresponding one of the second arms when the first and second clamp portions are secured around the circular object.

In some embodiments, a riser clamp to secure a pipe can include a first clamp member and a second clamp member. Each of the first and second clamp members can include, respectively, a clamp portion, a first arm, a second arm, and a cross-sectional profile that extends along the clamp portion, the first arm, and the second arm. The cross-sectional profile can include a base portion and legs extending from opposing sides of the base portion. In an installed configuration of the riser clamp, the first and second clamp members can nest together to secure the pipe, with the legs of the cross-sectional profile along the first and second arms of the first clamp member being disposed between the legs of the cross-sectional profile along the first and second arms, respectively of the second clamp member, so that the first and second clamp members collectively form rectangular cross-sectional profiles along the first and second arms of the first and second clamp members.

In some embodiments a clamp to secure a circular object can include a first clamp member and a second clamp member. The first clamp member can have a first clamp portion and first arms that extend radially from opposing sides of the first clamp portion towards free ends of the first arms, each of the first arms exhibiting a respective first C-shaped cross-sectional profile with a first base portion and first opposing legs. The second clamp member can have a second clamp portion and second arms that extend radially from opposing sides of the second clamp portion, each of the second arms exhibiting a respective second C-shaped cross-sectional profile with a second base portion and second opposing legs. The first clamp portion and the second clamp portion can be configured to secure the circular object therebetween, with each of the first arms aligned with a corresponding one of the second arms so that: the first and second C-shaped cross-sectional profiles of each set of the corresponding first and second arms are nested together, the first opposing legs of each of the first C-shaped cross-sectional profiles extend from the associated first base portion towards the corresponding second arm, and the second opposing legs of each of the second C-shaped cross-sectional profiles extend from the associated second base portion towards the corresponding first arm In some embodiments, a clamp to secure a circular object can include a first clamp member and a second clamp member. The first clamp member can have first arms on opposing sides of a first clamp portion, each of the first arms including a respective first cross-sectional profile that includes a first base portion and first legs extending perpendicularly from opposing sides of the first base portion, with the first base portions extending away from the first clamp portion in opposing directions relative to each other. The second clamp member can have second arms on opposing sides of a second clamp portion, each of the second arms including a respective second cross-sectional profile that includes a second base portion and second legs extending perpendicularly from opposing sides of the second base portion, with the second base portions extending away from the second clamp portion in opposing directions relative to each other. Each of the first arms can be configured to align with a corresponding one of the second arms when the circular object is secured by the clamp with each of the first cross-sectional profiles removably nested with the second cross-sectional profile along the corresponding one of the second arms.

In some embodiments, a riser clamp to secure a pipe can include a first clamp member and a second clamp member. The first clamp member can include: a first clamp portion that is open in a first direction, and first arms that extend from opposing sides of the first clamp portion, each of the first arms including a cross-sectional profile with a first base portion that extends away from the first clamp portion transverse to the first direction and first legs that extend away from the base portion in the first direction. The second clamp member can include: a second clamp portion that is open in a second direction, and second arms that extend from opposing sides of the second clamp portion, each of the second arms including a cross-sectional profile with a second base portion that extends away from the second clamp portion transverse to the second direction and second legs that extend away from the base portion in the second direction. In an installed configuration of the riser clamp to secure the pipe, the first and second clamp members can be nested together, with the first and second clamp portions disposed to engage opposing sides of the pipe, the first legs extending toward the second arms to overlap with the second legs, and the second legs extending toward the first arms to overlap with the first legs.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "nested" and its derivatives (e.g., "nesting") indicates a configuration in which at least part of one object extends into at least part of another object. For example, a set of two "nested" clamp members can generally be configured so that at least part of one of the clamp members is able to fit together with (e.g., to fit within) at least part of the other clamp member.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As also described above, conventional clamps can be formed with multiple pieces. The clamps are accordingly sometimes sold or shipped as several loose pieces, with the assembly of the pieces occurring during installation. In some cases, conventional clamps can be purchased fully assembled, but can require disassembly and reassembly for installation. Managing this installation process, including management of loose pieces, can sometimes be difficult.

Similarly, conventional clamps can be configured to rely mainly on friction to support an object. In some cases, the forces required to establish sufficient frictional engagement may require relatively large material strength. Accordingly, conventional clamps can sometimes require relatively thick (and heavy) components.

Figure 1A:
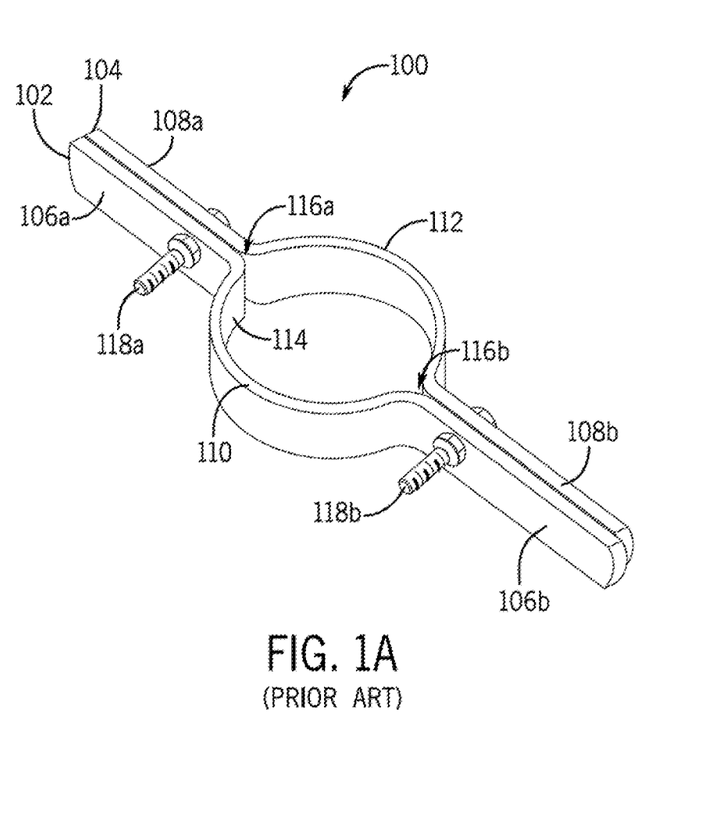
FIG. 1A is a front isometric view of a conventional clamp system.
Figure 1B:
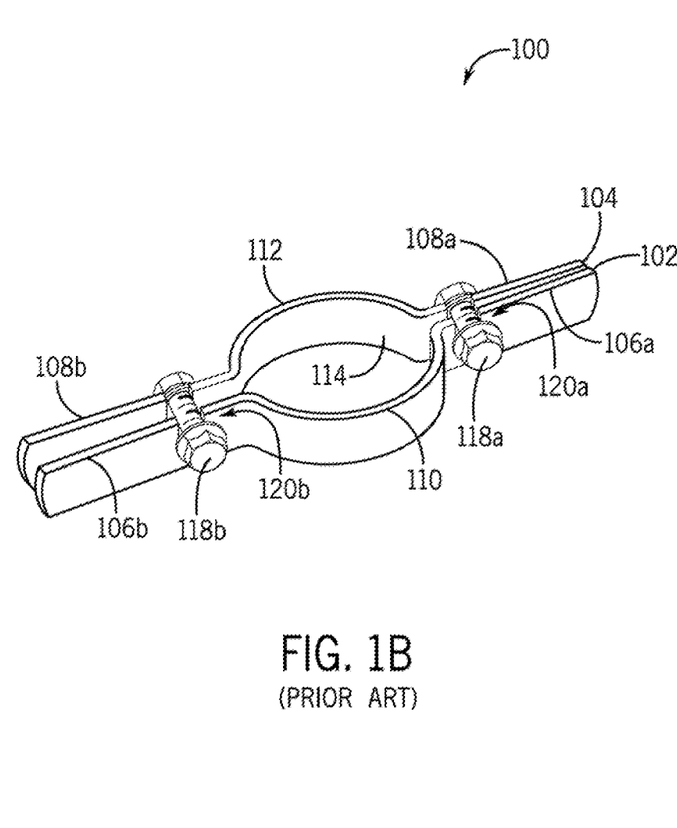
FIG. 1B is a back isometric view of the conventional clamp system of FIG. 1A.

One example of a conventional pipe clamp 100 with a multi-piece, frictional-engagement configuration is illustrated in FIGS. 1A and 1B. The clamp 100 includes several separate pieces, including a first clamp member 102, a second clamp member 104, and fasteners 118*a*, 118*b*.

The first clamp member 102 includes arms 106*a*, 106*b*. Disposed between the arms 106*a*, 106*b* is a first clamp portion 110. The first clamp portion 110 is arcuate to accommodate a circular object, such as a pipe (not shown in FIGS. 1A and 1B). Generally the arms 106*a*, 106*b* can rest on the floor or other surface (not shown) once installed, in order to support a pipe held by the clamp 100 relative to the surface.

The second clamp member 104 similarly includes arms 108*a*, 108*b* extending from either side of an arcuate second clamp portion 112. Similar to the arms 106*a*, 106*b* of the first clamp member 102, the arms 108*a*, 108*b* are configured rest on a floor or other surface once installed.

The first clamp member 102 and the second clamp member 104 are removably coupled with one another via the fasteners 118*a*, 118*b*. As also discussed below, the fasteners 118*a*, 118*b* can extend through through-holes disposed on the arms 106*a*, 106*b* and the arms 108*a*, 108*b* to secure the arms 106*a*, 106*b*, 108*a*, 108*b* together. As illustrated in FIGS. 1A and 1B, the fasteners 118*a*, 118*b* can be bolts secured in place by nuts. Accordingly, the bolts of the fasteners 118*a*, 118*b* can couple the first clamp member 102 and the second clamp member 104 via the tightening of the corresponding nuts.

Further, the clamp 100 is configured for a flat-surface frictional engagement with a pipe. As illustrated in FIG. 1A, in particular, coupling the first clamp member 102 to the second clamp member 104 creates seams 116*a*, 116*b* between the clamp members 102, 104. Other than the seams 116*a*, 116*b*, however, the clamp members 102, 104 can provide a substantially continuous interior contact surface 114 to frictionally engage the relevant pipe. With appropriate tightening of the fasteners 118*a*, 118*b*, this frictional engagement can prevent the pipe from slipping axially within the clamp 100 under rated loads.

As illustrated in FIG. 1B, in particular, alignment (and attachment) of the first clamp member 102 and the second clamp member 104 can be guided by alignment portions configured as notches 120*a*, 120*b* in the arms 108*a*, 108*b*, respectively. The notches 120*a*, 120*b* are open along the one side of the second clamp member 104, in order to receive fasteners 118*a*, 118*b*, during installation of the clamp 100, when the clamp portions 110, 112 are generally aligned. The open-ended configuration of the notches 120*a*, 120*b* can usefully allow the clamp member 104 to slide into engagement with the fasteners 118*a*, 118*b*, without requiring the nuts to be fully removed. Further, as the fasteners 118*a*, 118*b* are tightened, for example, the notches 120*a*, 120*b* can incrementally shift the second clamp member 104 into better alignment with the first clamp member 102. However, when the nuts are sufficiently loosened, this open-ended configuration can result in the fasteners 118*a*, 118*b* no longer holding the clamp members 102, 104 together.

In this light, although the clamp 100 can be useful in many respects, the use of multiple generally loose pieces design can result in a relatively complicated installation process. For example, a user may need to manage the clamp members 102, 104 as separate loose pieces, including movement of the clamp members 102, 104 into preliminary alignment for the notches 120*a*, 120*b* to receive the fastener 118*a*, 118*b*. The clamp 100 also generally relies on surface friction along the contact surface 114 to support a clamped object. As also noted above, this can result in a need for relatively strong materials, so that the clamp 100 can be tightened sufficiently around an object to provide appropriately strong frictional engagement.

Embodiments of the invention can provide an improved clamp (e.g., an improved pipe clamp) that can address the issues noted above, or otherwise improve on conventional arrangements. For example, in some embodiments, a clamp according to the invention can be configured with nesting clamp members, which can generally improve ease of installation for operators, as well as generally increasing the structural strength of the clamp for a given material thickness.

In some embodiments, a clamp according to the invention can be configured to be installed without requiring disassembly, thereby reducing (e.g., potentially eliminating) the need for operators to manage multiple loose pieces. In this regard, for example, embodiments of the invention can be installed without the need to remove any individual pieces from a larger assembly (e.g., in contrast to the clamp 100). For example, in some embodiments, a clamp can include hinging features that can allow clamp members to open to receive an object, then close around the object, without requiring disassembly of the clamp or any of its components.

In some embodiments, a clamp according to the invention can be configured to secure an object by at least partly biting into the object, rather than solely by friction. Accordingly, for example, some embodiments of the invention may provide similar load capacities as conventional clamps, while utilizing thinner structures.

Generally, embodiments of the present invention can be formed as clamps to support circular objects (e.g., pipes, bars, and so on). Some of the examples herein, present embodiments of the invention as clamps for pipes, including vertically-installed (e.g., riser) pipes. In some embodiments, clamps according to the invention can be used to secure other objects, including other types of pipes, in a variety of orientations (e.g., horizontally). In some embodiments, clamps according to the invention be used to support non-circular objects.

Figure 2:
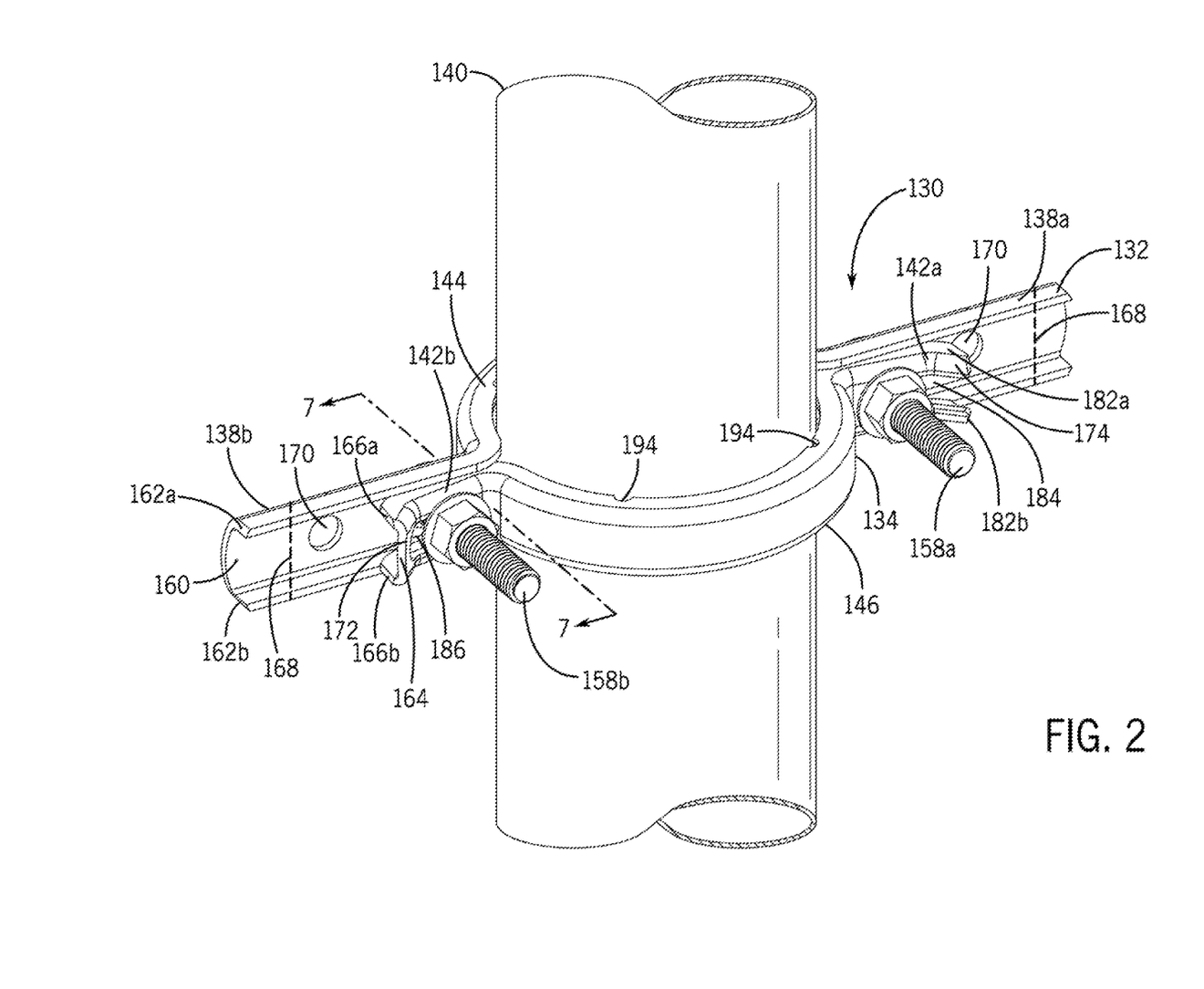
FIG. 2 is a front isometric view of a clamp system in an installed configuration, according to an embodiment of the invention.
Figure 3:
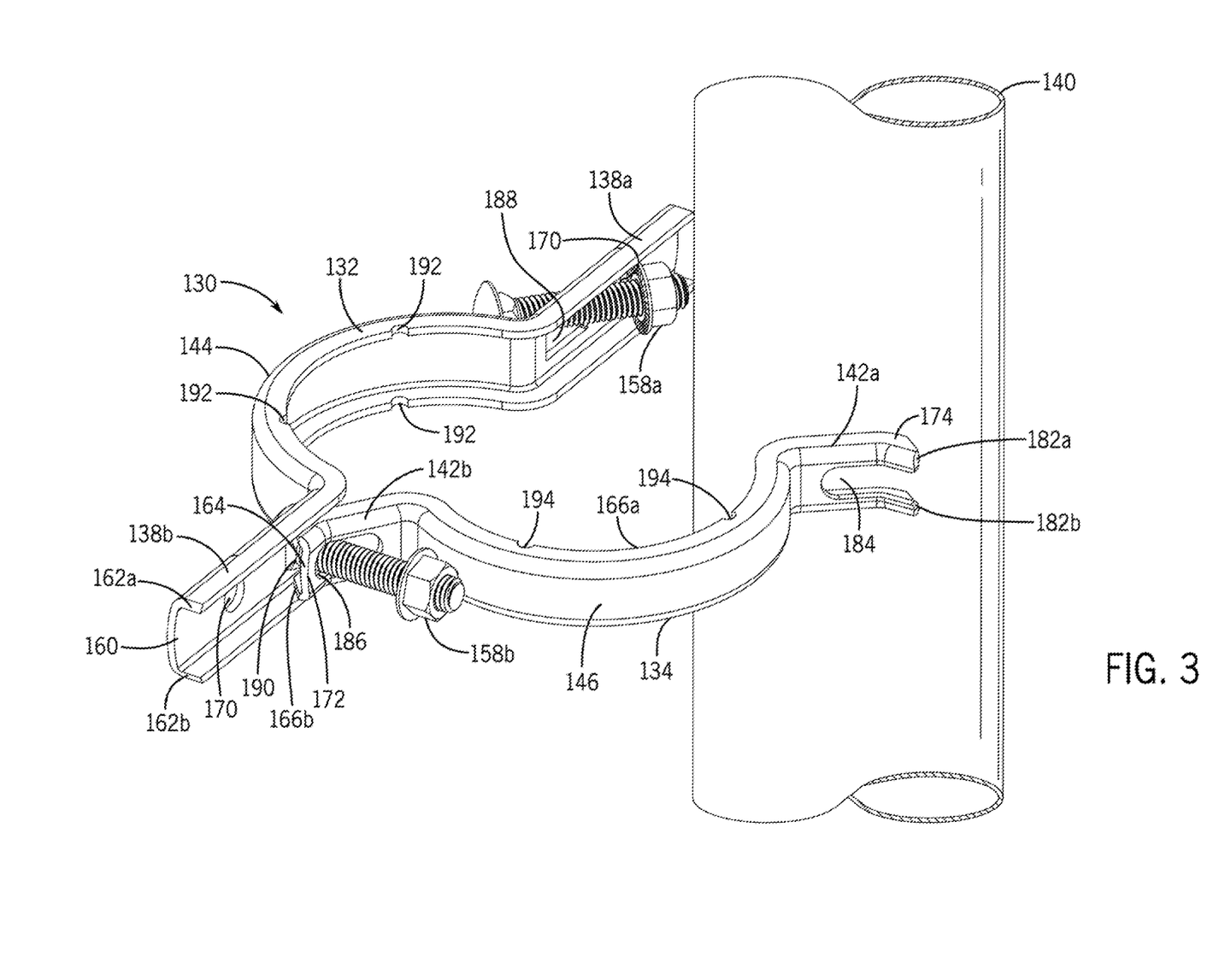
FIG. 3 is a front isometric view of the clamp system illustrated in FIG. 2 in an installation configuration, illustrating part of a method of installation according to an embodiment of the invention.

FIGS. 2 through 7 illustrate an example configuration of a clamp 130, according to one embodiment of the invention. Referring specifically to FIGS. 2 and 3, the clamp 130 includes a first clamp member 132 and a second clamp member 134 that are configured to collectively engage a pipe or other object.

The clamp 130 is generally configured as a riser clamp, although other configurations are possible. Accordingly, for example, arms 138a, 138b extend laterally away from either side of a first clamp portion 144.

Figure 4A:
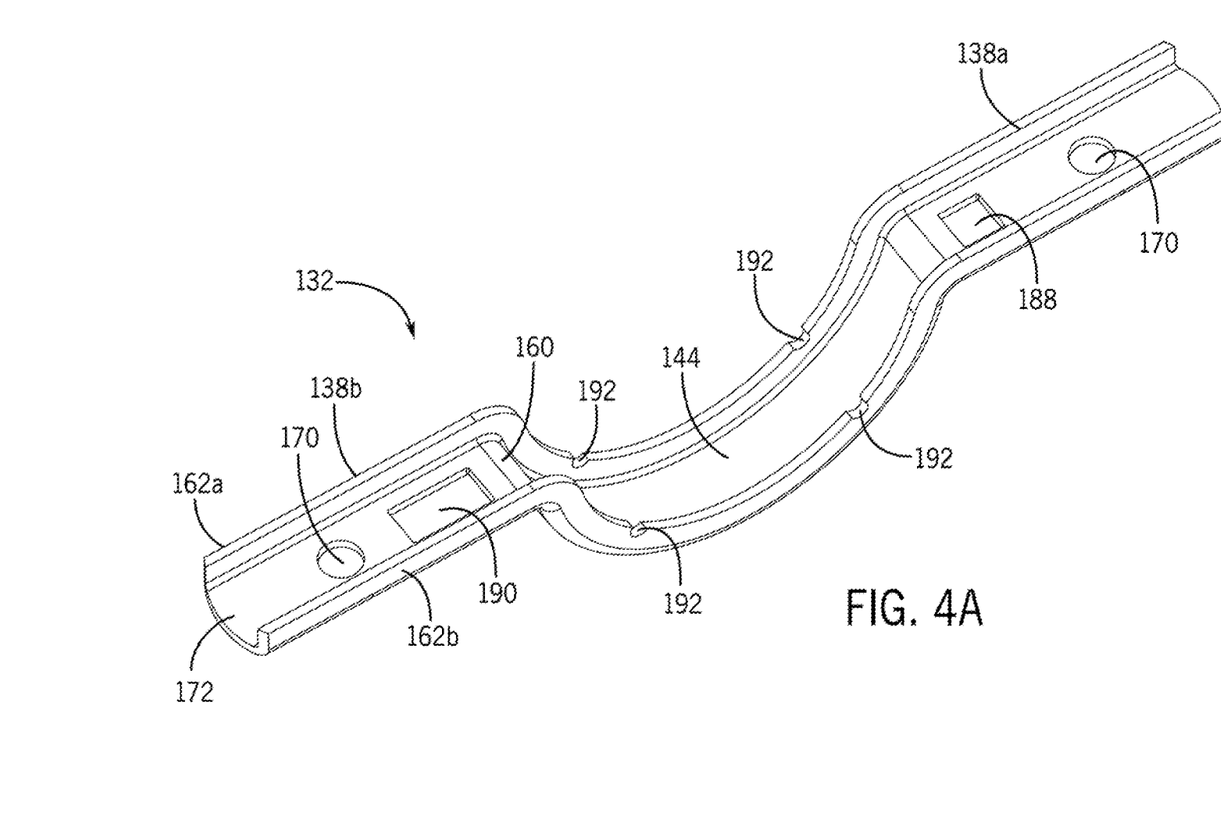
FIGS. 4A and 4B are isometric views of clamp members of the clamp system illustrated in FIG. 2.

As illustrated in FIG. 4A in particular, the arms 138a, 138b and the first clamp portion 144, generally, are formed with a C-shaped cross-section (see also FIGS. 6 and 7), with a first base portion 160 and a first set of opposing legs 162a, 162b that define an open-sided substantially rectangular channel along the full length of the clamp member 132. In other embodiments, other cross-sections are possible, including other generally C-shaped cross-sections.

In the embodiment illustrated, each of the arms 138a, 138b include a through-hole 170. This may be useful, for example, in order to allow the arms 138a, 138b to be attached to other structures.

In some embodiments, arms of opposing clamp members can include apertures configured to receive fasteners to secure the clamp members together around a circular object. In some embodiments, the apertures can be elongate slots in order to allow pivoting movement of the fasteners. As illustrated in FIG. 4A, for example, the arms 138a, 138b include apertures 188, 190, respectively, which are configured to receive fasteners 158a, 158b.

In the embodiment illustrated, the apertures 188, 190 are fully enclosed rectangular slots, with the aperture 188 configured to be generally square in shape and the aperture 188 configured to be an elongated generally rectangular shape. Accordingly, the apertures 188, 190 allow the fasteners 158a, 158b to translate relatively freely along, but not out of, the apertures 188, 190 when the fasteners 158a, 158b are appropriately loosened but not disassembled.

Figure 7:
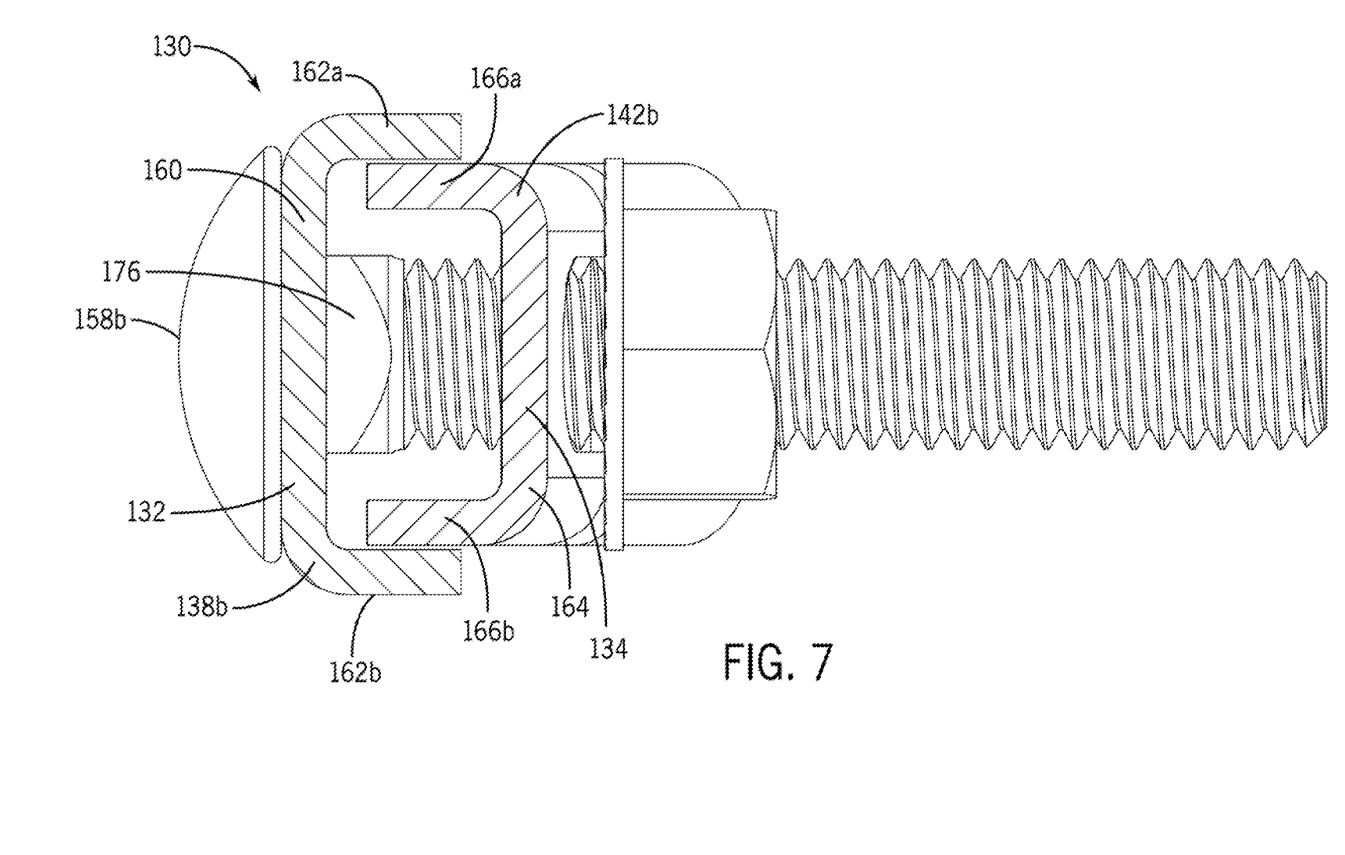
FIG. 7 is a side sectional partial view of the clamp system illustrated in FIG. 2, in the installed configuration, taken along plane 7-7 of FIG. 2

In some embodiments, a width of the apertures 188, 190 in an axial direction (relative to a clamped object) and a length of the aperture 188 in a lateral direction may be approximately the same as the dimension of a square neck of one of the fasteners 158a, 158b (see, e.g., neck 176 in FIG. 7). Accordingly, for example, the shoulder can nest into the relevant aperture 188, 190 when the clamp 130 is fully assembled to further secure the fastener 158a, 158b, and the clamp 130 generally.

In other embodiments, other configurations are possible. For example, in some embodiments, both of the apertures 188, 190 can be elongated shapes. Similarly, in some embodiments, the lateral ends of the apertures 188, 190 can be rounded or otherwise contoured.

As also noted above, the first clamp portion 144 is disposed between the arms 138a, 138b of the clamp member 132. The first clamp portion 144 is generally configured contact an object 140 (e.g., a riser pipe) to secure the object 140 in the clamp 130. In this regard, for example, the first clamp portion 144 can be formed with an inner radius of curvature that generally corresponds to (e.g., matches or is slightly smaller than) an outer diameter of the object 140. In some embodiments, the arcuate length of the first clamp portion 144 may be less than an expected half-circumference of an object to be secured by the clamp 130.

In some embodiments, other features can be included. For example, in the embodiment illustrated, the clamp portion 144 includes a set of drainage holes 192 that extend as half-circle notches into the free edges of the legs 162a, 162b. The drainage holes 192 can be useful, for example, to drain away water that may be sweated by a pipe secured by the clamp 130, in order to reduce the likelihood of rusting.

In some embodiments, as illustrated in FIG. 2 in particular, one or both of the arms 138a, 138b can include a cutting guide 168. In some embodiments, the cutting guide 168 can be used to assist an operator in cutting the clamp 130 to a desired size. For example, in installations where the initial length of the arms 138a, 138b may result in clearance issues, it may be possible to shorten the arms 138a, 138b by cutting the arms 138a, 138b at the guides 168. To facilitate easier shortening of the arms 138a, 138b, for example, the guides 168 can be scored or otherwise marked or weakened. In some embodiments, the cutting guides 168 can facilitate shortening of the arms 138a, 138b by processes other than cutting (e.g., by repeated bending to cause local material failure). In some embodiments, multiple cutting guides (not shown) can be provided on each of the arms 138a, 138b, to facilitate selective shortening of the arms 138a, 138b to one of several lengths.

Figure 4B:
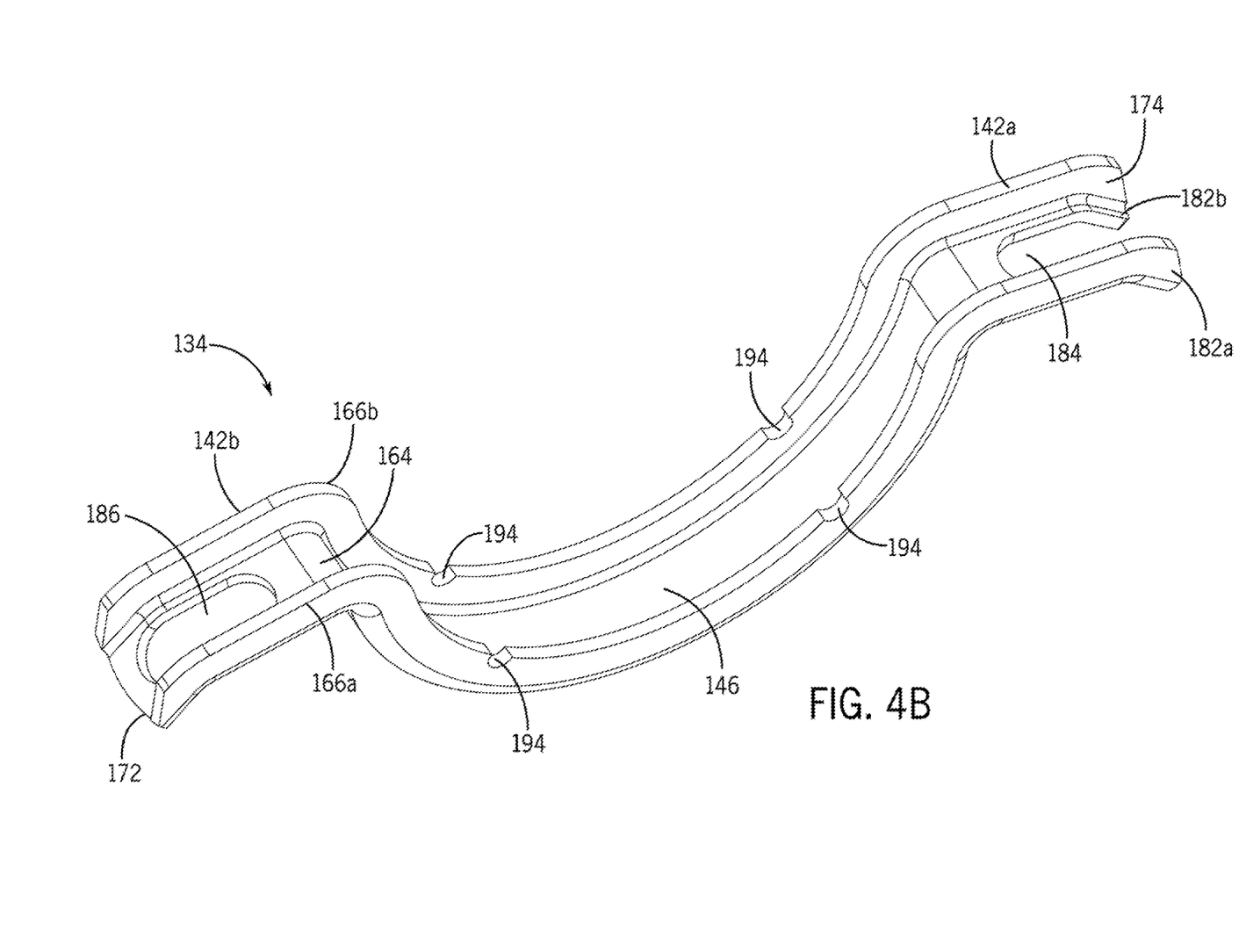

Referring in particular to FIG. 4B, the second clamp member 134 can be generally similar to the clamp member 132. For example, the second clamp member 134 includes arms 142a, 142b extending laterally away from either side of a second clamp portion 146. Like the arms 138a, 138b, the arms 142a, 142b and the second clamp portion 146, generally, are formed with a C-shaped cross-section (see also FIGS. 6 and 7), with a second base portion 164 and a second set of opposing legs 166a, 166b that generally define an open-sided rectangular channel along the full length of the second clamp member 134. As also discussed below, the arms 142a, 142b and the second clamp portion 146 exhibit a smaller cross-section than the arms 138a, 138b and the first clamp portion 144, so that the second clamp member 134 can be nested within the first clamp member 132.

In some embodiments, a clamp member according to the invention can include one or more angled ends that can assist in moving the clamp member between installation and installed configurations or help to retain a fastener in engagement with the clamp member. In the embodiment illustrated, for example, the arm 142b of the clamp member 132 includes an angled end 172, and the arm 142a includes an angled end 174. Generally, the angled ends 172, 174 exhibit the same C-shaped cross-sectional profile as the rest of the arms 142a, 142b, but angle away from a plane defined by the free edges of the legs 166a, 166b along the remainder of the arms 142a, 142b. Accordingly, the angled ends 172, 174 angle away from the clamp member 132 when the clamp 130 is in the installed configuration. As also discussed below, the angled ends 174, 172 can be nested within the arms 138a, 138b, respectively, depending on the relative orientations of the clamp members 132, 134, or can extend outside of the arms 138a, 138b.

As illustrated in FIG. 4B in particular, the arm 142a includes an aperture 184, and the arm 142b includes an aperture 186. Both of the apertures 184, 186 are configured as elongated, generally rectangular slots, with rounded elongate ends, which can allow the fasteners 158a, 158b to translate relatively freely along the apertures 184, 186 when the fasteners 158a, 158b are appropriately loosened.

Like the apertures 188, 190 (see, e.g., FIG. 4A), the aperture 186 is generally configured as a fully enclosed slot. In contrast, the aperture 184 is generally configured as a partially enclosed slot, with an open end coincident with the free end of the arm 142a. Accordingly, for example, the fastener 158a can be pivoted out of the aperture 184 without fully disassembling the nut from the bolt (see, e.g., FIG. 3). In other embodiments, other configurations for the apertures 184, 186 are possible.

As also noted above, the arms 142a, 142b include angled ends 172, 174. In the embodiment illustrated, the apertures 184, 186 extend onto the angled ends 174, 172. Further, the open end of the aperture 184 is generally defined by a first angled portion 182a and a second angled portion 182b of the angled end 174. Usefully, the separated angled portions 182a, 182b can allow the fastener 158a to pivot in and out of the aperture 184 when the fastener 158a is loosened. Further, the angled portions 182a, 182b can collectively serve as a catch to secure the fastener 158a within the aperture 184 when the fastener 158a is appropriately tightened.

As also noted above, the second clamp portion 146 is disposed between the arms 142a, 142b of the second clamp member 134. The second clamp portion 146 is generally configured to contact the object 140 to secure the object 140 in the clamp 130. In this regard, for example, the second clamp portion 146 can be formed with an inner radius of curvature that generally corresponds to (e.g., matches or is slightly smaller than) the outer diameter of the object 140. Thus, for example, as also discussed below, the object 140 can be firmly clamped between the first and second clamp portions 144, 146 (see, e.g., FIG. 2). As similarly noted with regard to the first clamp portion 144, in some embodiments, the arcuate length of the second clamp portion 146 may be less than an expected half-circumference of an object to be secured by the clamp 130.

In some embodiments, other features can be included. For example, in the embodiment illustrated, the clamp portion 146 includes a set of drainage holes 194 that extend as half-circle notches into the free edges of the legs 166a, 166b. The drainage holes 194 can be useful, for example, to drain away water that may be sweated by a pipe secured by the clamp 130, in order to reduce the likelihood of rusting.

As also noted above, in some embodiments, the clamp 130 can be configured as a nesting clamp. This can be useful, for example, in order to help with alignment of the clamp members 132, 134 during installation of the clamp 130 and to improve the strength of the clamp 130 once installed. In some embodiments, as also noted above, the ability to nesting aspect of the clamp 130 can be enabled by size differences between the clamp member 132 and the second clamp member 134. In the embodiment illustrated, for example, the second clamp member 134 exhibits a generally smaller cross-section than the first clamp member 132 (see, e.g., FIG. 7). Accordingly, the second clamp member 134 is configured to nest within the first clamp member 132, with a channel defined by the base portion 160 and the legs 162a, 162b of the clamp member 132 receiving both of the legs 166a, 166b of the clamp member 134. In other embodiments, a reversed configuration is possible.

FIG. 7 illustrates one possible nesting configuration for the clamp 130. In the configuration illustrated, the clamp member 132 and the second clamp member 134 are nested together with the second clamp member 134 nested within the clamp member 132, with the open sides of the respective C-shaped, profiles facing each other, and with the legs 166a, 166b spaced apart from (i.e., not contacting) the base portion 160. The fasteners 158a, 158b (only 158b shown in FIG. 7) can then be tightened, as appropriate, to tighten the clamp member 132 and the second clamp member 134 together. In some situations, this can result in an air gap between the clamp member 132 and the second clamp member 134, as well as a generally box-shaped cross-section of the full assembly.

In the nesting configuration illustrated in FIG. 7, the leg 162a can contact, and can remain substantially parallel to the leg 166a. Similarly, the first leg 162b can contact, and can remain substantially parallel to the second leg 166b. In some embodiments, the first base portion 160 and the second base portion 164 can be substantially parallel to one another. In some embodiments, the first base portion 160 can be substantially perpendicular to the legs 162a, 162b and the second base portion 164 can be substantially perpendicular to the legs 166a, 166b.

As also noted above, in some embodiments, the clamp 130 can generally provide a box-shaped clamp profile. This can be useful, for example, in order to provide relatively high clamp strength during loading. Further, the interaction of the second legs 166a, 166b with the first legs 162a, 162b can generally resist the tendency of the second clamp member 134 to flatten as the fasteners 158a, 158b are tightened. Accordingly, the clamp 130 can generally exhibit significant structural integrity, even under relatively large compressive loading from the fasteners 158a, 158b.

In some embodiments, the first clamp portion 144 and the second clamp portion 146 can contact the object 140 along separate contact areas (e.g., rather than over the single continuous contact area 114, as with the clamp 100 of FIGS. 1A and 1B). In some embodiments, for example, this can reduce or eliminate the reliance on surface friction to support an object, in contrast to conventional clamps.

Figure 5:
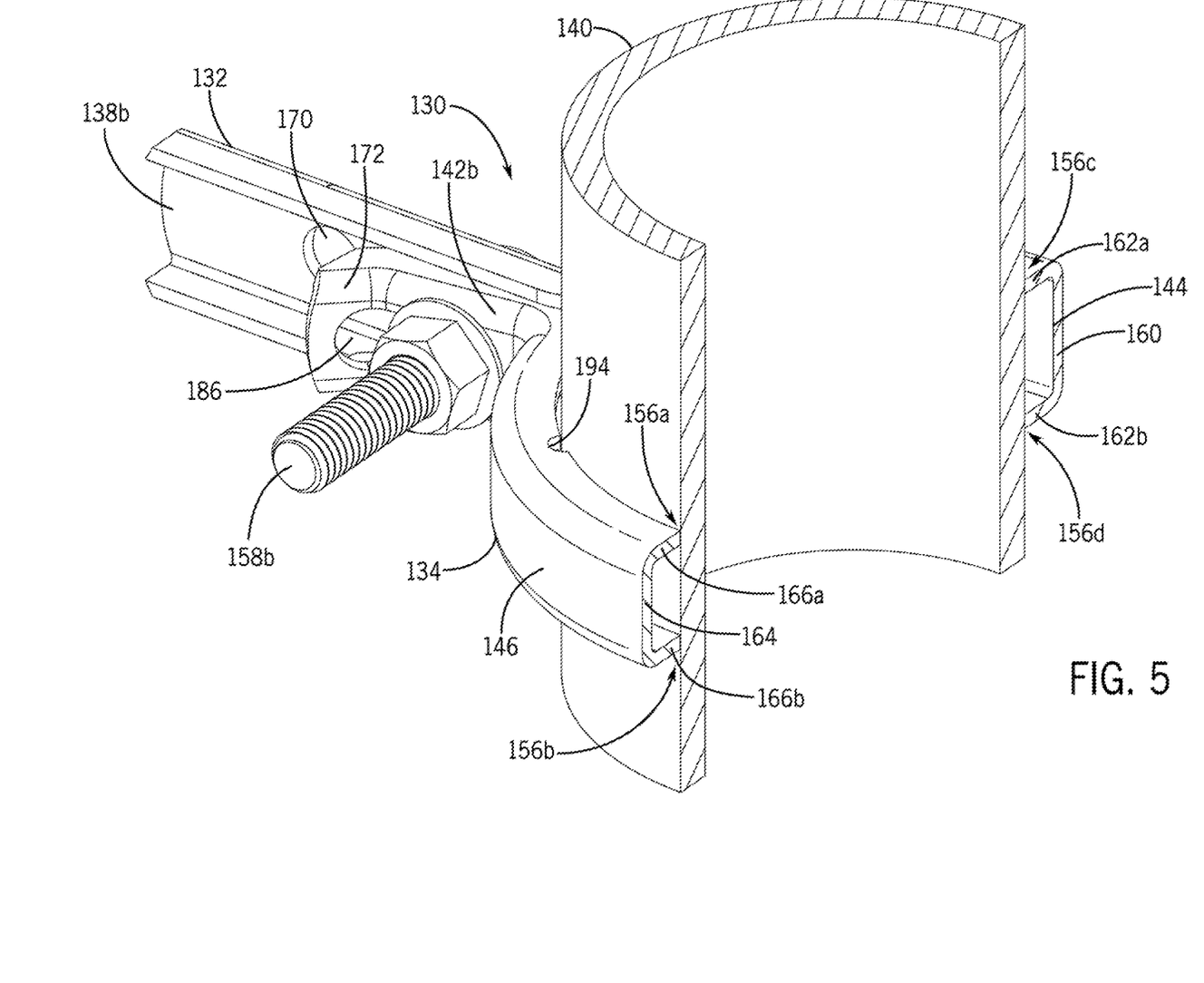
FIG. 5 is a front isometric cross-sectional view of the clamp system illustrated in FIG. 2.
Figure 6:
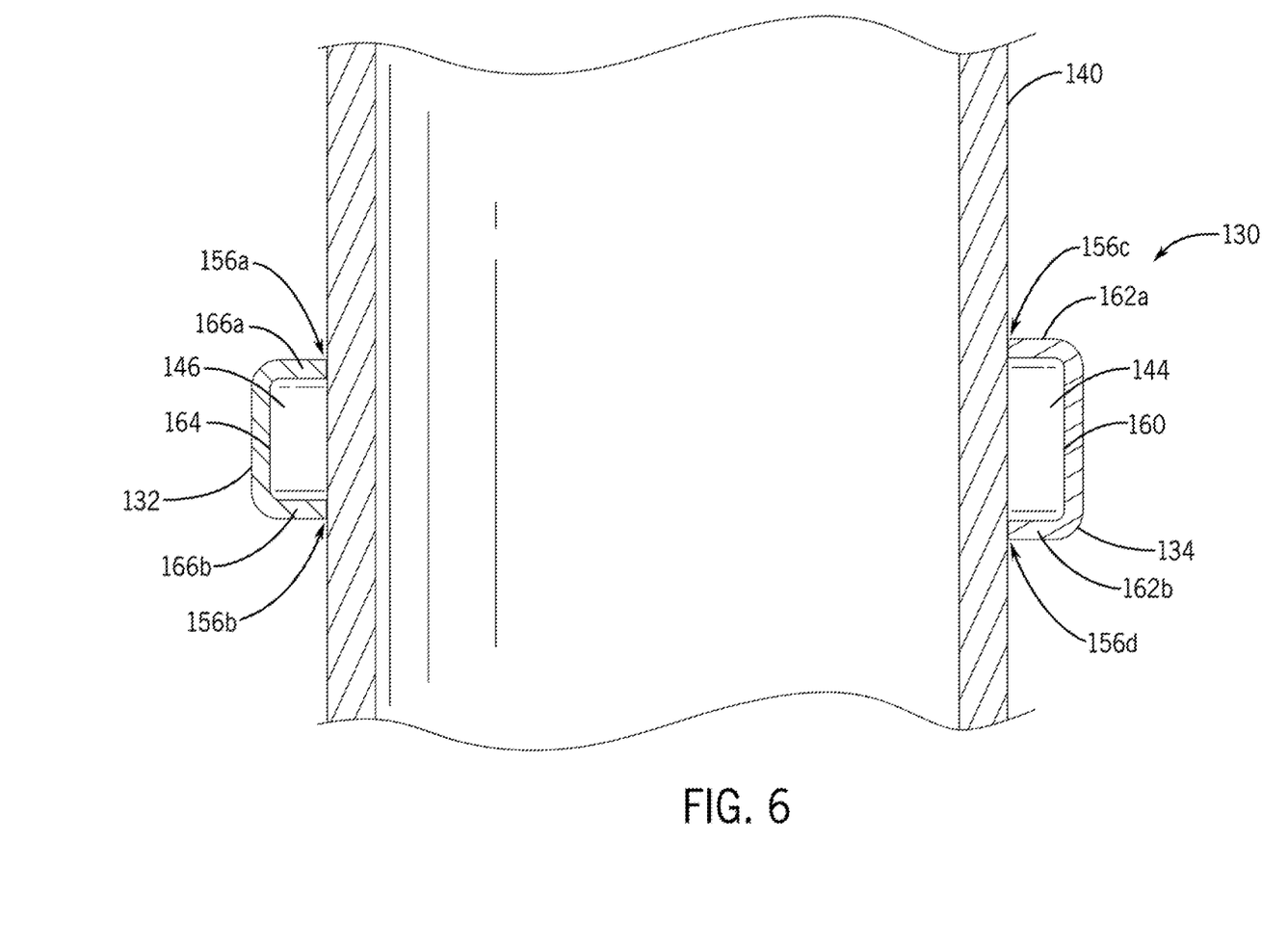
FIG. 6 is a cross-sectional, right side view of the clamp system illustrated in FIG. 2.

FIGS. 5 and 6 in particular, illustrate an example contact configuration provided by the clamp 130. In the embodiment illustrated, a plurality of discrete object contact areas 156a, 156b, 156c, 156d (see FIG. 6), generally corresponding to the edges of the legs 166a, 166b, 162, and 162b, respectively, directly engage the object 140 when the clamp 130 is clamped around the object 140. With sufficient clamping force, for example, this can prevent the object 140 from axial (or other) movement relative to the clamp 130. For example, when the fasteners 158a, 158b are appropriately tightened (see, e.g., FIG. 2), four discrete areas of pressure can occur, along each of the object contact areas 156a, 156b, 156c, 156d, as correspond to the extension of the legs 166a, 166b, 162, and 162b, respectively, along the clamp portions 144, 146. In some situations, it may be beneficial to contact the object 140 at four discrete areas, as illustrated. In other embodiments, a different number of contact areas may be used.

Generally, as the first base portion 160 is compressed towards the object 140 by the fasteners 158a, 158b (see, e.g., FIG. 2), the first legs 162a, 162b can move towards the object 140. Similarly, as the second base portion 164 is compressed towards the object 140 by the fasteners 158a, 158b, the second legs 166a, 166b can also move towards the object 140. As the clamping force on the clamp members 132, 134 is increased, the object contact areas 156a, 156b, 156c, 156d can begin to exert sufficient force on the object 140 to hold the object 140 in place and prevent the object 140 from slipping. With appropriate pressure (e.g., with appropriate tightening of the fasteners 158a, 158b), the first and second clamp portions 144, 146, along the object contact areas 156*a*, 156*b*, 156*c*, 156*d* provided by the free edges of the legs 162*a*, 162*b*, 166*a*, 166*b*, can slightly penetrate or compress the material of the object 140 to provide a relatively strong engagement between the clamp 130 and the object 140. Accordingly, the configuration of the clamp 130 to provide the discrete object contact areas 156*a*, 156*b*, 156*c*, 156*d* can, in some embodiments, reduce (e.g., replace) the need for surface friction to hold objects in place via clamps.

In other embodiments, other configurations are possible. For example, in some embodiments, a clamp according to the invention may include clamp portions that provide a continuous clamping surface (e.g., generally flat cross-section clamp portions), as well as nested clamp arms. Similarly, in some embodiments, padding or other components or configurations can be provided, in order to provide appropriate clamping interfaces for particular installations or uses.

In some embodiments, clamps according to the invention can be configured as hinged clamps, which can swing open or closed without being disassembled. In some embodiments, some parts of a clamp can remain coupled together (and the clamp can remain generally assembled) while other parts of the clamp are uncoupled for relative hinged movement. For example, in some embodiments, two of a clamp's arms can remain coupled together while the other two arms are uncoupled.

In this regard, for example, FIG. 3 illustrates one possible hinging installation configuration for the clamp 130. In the configuration illustrated, the fastener 158*b* extends through the aperture 190, 186, but has been loosened in order to relatively loosely couple the arm 138*b* to the arm 142. In this way, for example, as assisted by the elongate configuration of the aperture 190, 186, the arms 138*b*, 142 can move relative to each other during installation, without being fully disassembled into separate loose components.

In some embodiments, the fastener 158*b* can be located in a different portion of the aperture 186 during installation than it is after installation is complete. For example, the elongate configuration of the apertures 186, 190 allow the fastener 158*b* to slide to any number of different orientations. This, in turn, can help to provide a significant range of hinging movement for the clamp 130, including hinging movement not restricted to a fixed axis of rotation.

In some embodiments, an angled end can assist in hinged movement of a clamp. In the embodiment illustrated, for example, the configuration of the angled end 172 and the apertures 190, 186 enable a range of hinging movement of the clamp 130. For example, with the clamp 130 in an open, installation configuration (see, e.g., FIG. 3), the second clamp member 134 can be hinged relative to the clamp member 132, so that the angled end 172 is disposed substantially parallel to, and nested within, the arm 138*b*. This can be useful, for example, in order to guide the hinging movement of the clamp member 134, while maintaining the clamp members 132, 134 in alignment to be readily hinging closed.

In contrast, when the clamp 130 is in a closed, installed configuration (see, e.g., FIG. 2), the second clamp member 134 is disposed in a rotated orientation (relative to the installation configuration), so that a length of the arm 142 between the angled end 172 and the second clamp portion 146 is disposed substantially parallel to, and nested within, the arm 138*b*. In this regard, for example, the angled end 172 and the configuration of the apertures 186, 190, can allow the arm 142 to remain nested within the clamp member 132 throughout installation, even as the particular portions of the two clamp members 132, 134 that are nested together change.

Still referring to FIG. 3, the aperture s184, 188 can also help the clamp 130 to hinge open and closed, without being disassembled. For example, as also noted above, the aperture 188 can allow the fastener 158*a* to be positioned at various locations and angles during installation. Further, due to the open-ended configuration of the aperture 184, a portion of the fastener 158*a* can be moved into and out of the aperture 184 without disassembling the fastener 158*a* itself (e.g., removing the nut from the bolt). Accordingly, without disassembling the clamp 130, including the fasteners 158*a*, 158*b*, the second clamp member 134 can be pivoted open to receive the object 140, then pivoted to a closed orientation with the arm 142*a* of the second clamp member 134 nested within the arm 138*a* of the clamp member 132. The still fully-assembled fastener 158*a* can then be moved into the aperture 184 via the open end of the aperture 184, and both fasteners 158*a*, 158*b* tightened to secure the object 140 in place.

In some embodiments, the fasteners 158*a*, 158*b* can loosely couple the clamp member 132 to the second clamp member 134 during installation, thus ensuring proper alignment with one another and the object 140. For example, because the fasteners 158*a*, 158*b* need not be disassembled to install the clamp 130, the fasteners 158*a*, 158*b* can help operators generally align the clamp members 132, 134 to be nested together.

As also noted above, in some embodiments, the through-holes 170 can be used to secure the clamp 130 to another object. For example, the clamp 130 can be secured to vertically-oriented threaded rods (not shown) via the through-holes 170, so that the clamp 130 can secure the object 140 (or another object) in a horizontal or other orientation (not shown).

Thus, embodiments of the invention can provide can provide an improved clamp for pipes and other objects. For example, embodiments of the invention can be configured to be installed without needing disassembly and reassembly, including of loose hardware. Similarly, in some embodiments, clamps according to the invention can utilize multiple contact areas to secure an object, thereby allowing for the use of thinner (or otherwise reduced-strength) material than in conventional clamps. In this way, for example, embodiments of the invention can support larger loads using relatively less material than conventional clamps.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

Various features of the invention are set forth in the following claims.

The invention claimed is:

1. A clamp to secure a circular object, the clamp comprising:
    a first clamp member having a first clamp portion and first arms that extend radially from opposing sides of the first clamp portion towards free ends of the first arms, each of the first arms exhibiting a respective first C-shaped cross-sectional profile with a first base portion and first opposing legs; and
    a second clamp member having a second clamp portion and second arms that extend radially from opposing sides of the second clamp portion, each of the second arms exhibiting a respective second C-shaped cross-sectional profile with a second base portion and second opposing legs, the first clamp portion and the second clamp portion being configured to secure the circular object therebetween, with each of the first arms aligned with an associated one of the second arms to form a set of associated first and second arms so that: the first and second C-shaped cross-sectional profiles of each of the sets of the associated first and second arms are nested together, the first opposing legs of each of the first C-shaped cross-sectional profiles extend from the first base portion of the first C-shaped cross-sectional profile towards the associated second arm, and the second opposing legs of each of the second C-shaped cross-sectional profiles extend from the second base portion of the second C-shaped cross-sectional profile towards the associated first arm;

wherein the first and second C-shaped cross-sectional profiles of the first and second arms extend continuously from the first and second arms along the first and second clamp portions, respectively; and wherein the first opposing legs of the first C-shaped cross-sectional profile and the second opposing legs of the second C-shaped cross-sectional profile are configured to engage the circular object along the first and second clamp portions, respectively, to secure the circular object within the clamp.

2. The clamp of claim 1, wherein for at least one of the sets of the associated first and second arms, the first opposing legs of the first C-shaped cross-sectional profile are nested within a channel defined between the second opposing legs of the second C-shaped cross-sectional profile.

3. The clamp of claim 2, wherein only part of the length of the first opposing legs of the first C-shaped cross-sectional profile, as measured from the first base portion toward free ends of the first opposing legs, is nested within the channel.

4. The clamp of claim 1, wherein the first and second clamp members are sized to secure the circular object within the clamp without the first opposing legs contacting the second base portion along either of the second arms.

5. The clamp of claim 4, wherein the first and second clamp members are sized to secure the circular object within the clamp without the second opposing legs contacting the first base portion along either of the first arms.

6. The clamp of claim 1, wherein a first width between the first opposing legs of the first C-shaped cross-sectional profile along the first clamp portion is smaller than a second width between the second opposing legs of the second C-shaped cross-sectional profile along the second clamp portion.

7. The clamp of claim 6, wherein the first and second widths are constant along the entire extent of the first and second C-shaped cross-sectional profiles, respectively.

8. The clamp of claim 1, wherein a first width between the first opposing legs of the first C-shaped cross-sectional profile of at least one of the first arms is smaller than a second width between the second opposing legs of the second C-shaped cross-sectional profile of the associated at least one of the second arms.

9. The clamp of claim 7, wherein the first clamp member is configured to hinge open relative to the second clamp member to receive the circular object while one of the first arms remains secured to the associated second arm with a fastener and the one of the first arms and the associated second arm remain nested together.

10. A clamp to secure a circular object, the clamp comprising:

a first clamp member having first arms on opposing sides of a first clamp portion, each of the first arms including a respective first cross-sectional profile that includes a first base portion and first legs extending perpendicularly from opposing sides of the first base portion, with the first base portions extending away from the first clamp portion in opposing directions relative to each other; and a second clamp member having second arms on opposing sides of a second clamp portion, each of the second arms including a respective second cross-sectional profile that includes a second base portion and second legs extending perpendicularly from opposing sides of the second base portion, with the second base portions extending away from the second clamp portion in opposing directions relative to each other;

each of the first arms being configured to align with an associated one of the second arms when the circular object is secured by the clamp with each of the first cross-sectional profiles removably nested with the second cross-sectional profile along the associated one of the second arms;

wherein the second legs of at least one of the second arms are configured to extend from the second base portion towards the first base portion of the associated at least one of the first arms, but not to contact the first base portion, when the first and second clamp portions are secured around the circular object; and wherein the first legs of the associated at least one of the first arms are configured to extend from the first base portion towards the second base portion along the at least one of the second arms, but not to contact the second base portion, when the first and second clamp portions are secured around the circular object.

11. The clamp of claim 10, wherein the first legs of each of the first arms are configured to nest between the second legs of the associated one of the second arms when the first and second clamp portions are secured around the circular object.

12. The clamp of claim 11, wherein the first legs are configured to overlap with the second legs, when the first and second clamp portions are secured around the circular object, so that the first and second arms collectively form box-shaped cross-sectional profiles on the opposing sides of the first and second clamp portions.

13. The clamp of claim 10, wherein the first and second legs extend continuously from the first and second arms onto the first and second clamp portions; and wherein the first and second legs are configured to engage the circular object along the first and second clamp portions to secure the circular object within the clamp.

14. The clamp of claim 10, wherein the first clamp member is configured to hinge between:

an installed configuration, in which:
each of the first arms is coupled to the associated one of the second arms with a respective fastener to secure the first and second clamp portions around the circular object; and an installation configuration, in which:
one of the first arms and the associated one of the second arms remain coupled together with the respective fastener; and another of the first arms and the associated one of the second arms are not coupled together with the respective fastener, and are pivoted apart from each other to open the clamp to receive the circular object.

15. The clamp of claim 14, wherein the clamp is a riser clamp.

16. A riser clamp to secure a pipe, the riser clamp comprising:
  a first clamp member that includes: a first clamp portion that is open in a first direction, and first arms that extend from opposing sides of the first clamp portion, each of the first arms including a cross-sectional profile with a first base portion that extends away from the first clamp portion transverse to the first direction and first legs that extend away from the first base portion in the first direction; and
  a second clamp member that includes: a second clamp portion that is open in a second direction, and second arms that extend from opposing sides of the second clamp portion, each of the second arms including a cross-sectional profile with a second base portion that extends away from the second clamp portion transverse to the second direction and second legs that extend away from the second base portion in the second direction;
  in an installed configuration of the riser clamp to secure the pipe, the first and second clamp members being nested together, with the first and second clamp portions disposed to engage opposing sides of the pipe, the first legs extending toward the second arms to overlap with the second legs, and the second legs extending toward the first arms to overlap with the first legs.

17. The riser clamp of claim 16, wherein the first base portions extend away from the first clamp portion in opposing directions relative to each other, and at least one of the first base portions includes a first elongate slot configured to receive a fastener to secure the first and second clamp members around the pipe; and
  wherein the second base portions extend away from the second clamp portion in opposing directions relative to each other, and at least one of the second base portions includes a second elongate slot configured to receive a fastener to secure the first and second clamp members around the pipe.

18. The riser clamp of claim 17, wherein, in the installed configuration, the first and second elongate slots are aligned with each other to receive a common fastener; and
  wherein, to move to an installation configuration, the first clamp member is configured to pivot about the common fastener at the first elongate slot to move the first clamp portion away from the second clamp portion.

* * * * *